United States Patent [19]
Liaw et al.

[11] Patent Number: 5,968,585
[45] Date of Patent: Oct. 19, 1999

[54] PROCESS FOR RECOVERY OF PROTEIN FROM AQUEOUS MEDIA IN CORN WET MILLING

[75] Inventors: Gin C. Liaw, Decatur; Munir Cheryan, Urbana, both of Ill.

[73] Assignee: A.E. Staley Manufacturing Company, Decatur, Ill.

[21] Appl. No.: 08/798,940

[22] Filed: Feb. 11, 1997

Related U.S. Application Data

[63] Continuation-in-part of application No. 08/595,380, Feb. 1, 1996, Pat. No. 5,773,076.

[51] Int. Cl.⁶ .................................................. A23J 1/14
[52] U.S. Cl. ...................... 426/656; 426/478; 426/489; 426/629; 210/641; 210/650; 210/651; 210/653; 530/376; 530/377; 530/414
[58] Field of Search ..................... 426/489, 490, 426/629, 656, 478, 495; 210/641, 650, 651, 653; 530/376, 377, 414

[56] References Cited

U.S. PATENT DOCUMENTS

| | | | |
|---|---|---|---|
| 3,397,991 | 8/1968 | Johnson et al. | 99/17 |
| 3,995,071 | 11/1976 | Goodnight, Jr. et al. | 426/598 |
| 4,018,752 | 4/1977 | Bühler et al. | 260/112 R |
| 4,088,795 | 5/1978 | Goodnight, Jr. et al. | 426/598 |
| 4,163,010 | 7/1979 | Garbutt | 260/112 R |
| 4,225,629 | 9/1980 | Saunders et al. | 426/583 |
| 5,773,076 | 6/1998 | Liaw et al. | 426/656 |

FOREIGN PATENT DOCUMENTS

| | | |
|---|---|---|
| 0 176 621 A1 | 4/1986 | European Pat. Off. . |
| 0 452 238 A2 | 10/1991 | European Pat. Off. . |

OTHER PUBLICATIONS

PallSep VMF Dynamic Membrane Filter (Pall Corporation 1995).
Scepter Stainless Steel Membrane Systems, Proven Technology For The Most Challenging Separations (Graver Chemical Company 1996).
Mohr et al, Membrane Applications and Research in Food Processing, Chapter 5.3.1, pp. 104–110 (Noyes Data Corp. 1989).
Corn Wet Milled Feed Products (Corn Refiners Association, Inc. 1989).
Corn Gluten Feed and Gluten Meal (Corn Industries Research Foundation, Inc. 1959).
May, Wet Milling: Process and Products, Form Corn (Edited by Stanley Watson 1987).

*Primary Examiner*—Milton Cano
*Attorney, Agent, or Firm*—Williams, Morgan & Amerson, P.C.

[57] ABSTRACT

An improved corn wet milling process is disclosed. In a process in which corn kernels are steeped in an aqueous solution and are milled to facilitate the separation of the components thereof, in which starch from the corn is separated from gluten, and in which at least one aqueous gluten-containing stream is generated, the improvement comprises membrane filtration of an aqueous gluten-containing stream, producing a gluten-enriched retentate, and removing water from the gluten-enriched retentate, thereby producing a substantially dry gluten product. This improved process provides an economical means of recovering a higher percentage of the available protein for inclusion in high value products.

8 Claims, 7 Drawing Sheets

PROCESS FOR RECOVERY OF PROTEIN FROM AQUEOUS MEDIA IN CORN WET MILLING

This is a continuation in part of U.S. application Ser. No. 08/595,380, filed on Feb. 1, 1996, now U.S. Pat. No. 5,773,076.

BACKGROUND OF THE INVENTION

This invention relates to an improved wet milling process for refining corn into useful products, in which recovery of proteins such as gluten is enhanced.

Corn kernels contain starch, protein, water, fiber, and other substances which can be separated to make various useful products. Gluten is one component of the kernel, and contains the majority of the protein that is present in corn, thus making it a desirable component for animal feed.

In order to refine the corn into end products such as starch, oil, and feed, a corn wet milling process is used. In general, kernels of corn are steeped in an aqueous solution under controlled conditions to soften the kernels and facilitate separation of the kernels' components. After steeping, the aqueous solution, referred to as steepwater, is drawn off. The corn kernel, swollen as a result of the steeping, is then coarse-milled to allow removal of the germ. Oil is removed from the germ and refined to make corn oil. The remainder of the germ is dried to form corn germ meal, or it may be used as an ingredient in corn gluten feed.

After the germ is removed, the remainder of the kernel is milled again to pulverize endosperm particles while leaving fibrous material nearly intact. Fiber is separated from the starch and gluten by screening. The fiber is then combined with the dried remains of the steepwater to make corn gluten feed.

The starch and gluten are then separated, in what is often referred to as the primary starch separation step, and the gluten is dried to form corn gluten meal. The primary starch separation is typically done by centrifugation, and produces a gluten-containing stream that typically comprises about 3–5% (by weight) total solids. This stream is usually sent through a gluten thickener centrifuge. This centrifugation produces a stream that is primarily water and a concentrated gluten stream (e.g., about 15% solids). Unfortunately, a significant amount of gluten is lost in this centrifugation step (i.e., is in the stream that is primarily water). The concentrated gluten stream is then usually sent to a gluten vacuum filter, further concentrating it, e.g. to about 38–43% dry solids. This concentrated stream is then sent to a gluten drier, to remove most of the remaining water (e.g., to about 90–95% dry solids). The dry end product is corn gluten meal.

Some of the starch is dried and may optionally be chemically modified before being sold to the food, paper, or textile industries. Corn sweeteners or ethanol are produced from the remaining starch.

Thus two of the main animal feed products of the corn wet milling process are corn gluten feed and corn gluten meal. Corn gluten feed is a medium protein, medium energy product. It is used in feeds or concentrates for cattle, poultry, and swine. It is commonly sold containing about 20% protein. Corn gluten meal is a high protein, high energy product. It is a valuable source of methionine to complement other commonly used protein sources in animal feed. Also, its high xanthophyll content makes it particularly valuable as an efficient pigmenting ingredient in poultry feeds. It is a particularly excellent feed ingredient for cattle, because it provides a high level of rumen-protected protein.

Because of its superior characteristics as animal feed, corn gluten meal can be sold for a significantly higher price than corn gluten feed. Therefore, corn refiners prefer to maximize production of corn gluten meal relative to corn gluten feed. In a typical wet milling process, significant amounts of gluten remain in end products other than corn gluten meal. However, this type of protein is too small to be recovered by centrifugation or conventional filtration.

Efficient means of concentrating and recovering the proteins from various aqueous process streams are important to the overall economics of the corn wet milling process.

Microfiltration and nanofiltration are techniques that have been used in the past in some starch-related applications. For example, European patent application 0,452,238 discloses using a nanofiltration membrane to filter a starch slurry, passing the dextrose in the slurry through the membrane while retaining the di-and trisaccharides, thereby producing a glucose syrup which is about 95% dextrose and 5% di- and trisaccharides. European patent application 0,176,621 discloses a process for obtaining glucose from thinned starch. The process includes a separation step that produces a glucose-enriched stream and a glucose-depleted stream. Membrane-based separation is disclosed as one suitable separation technique.

There is a long-standing need for enhanced recovery of proteins such as gluten in corn wet milling processes.

SUMMARY OF THE INVENTION

The present invention concerns an improvement in a corn wet milling process in which corn kernels are steeped in an aqueous solution and are milled to facilitate the separation of the components thereof, in which starch from the corn is separated from gluten, and in which one or more aqueous gluten-containing streams are generated. This improved process includes the steps of membrane filtration of an aqueous gluten-containing stream, producing a gluten-enriched retentate, and removing water from the gluten-enriched retentate, thereby producing a substantially dry gluten product. The process can optionally include additional membrane filtration steps, which further concentrate the gluten-enriched retentate prior to the final removal of water step.

The gluten-enriched retentate produced by the one or more membrane filtration steps preferably has a solids concentration of at least about 7% by weight, more preferably at least about 12% by weight, most preferably at least about 40% by weight.

In one particular embodiment of the present invention, the corn wet milling process includes the steps of separating corn starch from gluten, producing a first aqueous gluten-containing stream, which has a gluten concentration of about 2–5% d.s.; membrane filtering the first aqueous gluten-containing stream, producing as a retentate a second aqueous gluten-containing stream, which has a gluten concentration of about 13–15% d.s.; non-membrane vacuum filtration of the second aqueous gluten-containing stream, prior to the drying step, producing a third aqueous gluten-containing stream, which has a gluten concentration of about 38–43% d.s.; and drying the third aqueous gluten-containing stream to form a gluten product having a solids concentration of at least about 90% d.s.

In another particular embodiment of the present invention, the corn wet milling process includes the steps of separating corn starch from gluten, producing a first aqueous gluten-containing stream, which has a gluten concentration of about 2-5% d.s.; membrane filtering the first aqueous gluten-containing stream, producing as a retentate a second aqueous gluten-containing stream, which has a gluten concentration of about 13–15% d.s.; membrane filtering the second aqueous gluten-containing stream, producing as a retentate a third aqueous gluten-containing stream, which has a gluten concentration of about 25–30% d.s.; membrane filtering the third aqueous gluten-containing stream, producing as a retentate a fourth aqueous gluten-containing stream, which has a gluten concentration of about 38–43% d.s.; and drying the third aqueous gluten-containing stream to form a gluten product having a solids concentration of at least about 90% d.s. In this embodiment, the membrane filtration of the first aqueous gluten-containing stream is preferably done with a spiral-wound membrane, the membrane filtration of the second aqueous gluten-containing stream is preferably done with a ceramic or tubular polymeric membrane, and the membrane filtration of the third aqueous gluten-containing stream is preferably done with a stainless steel membrane. The price of the different types of membrane filters will affect the preferred combination of equipment in a multi-stage membrane filtration process.

The present invention can be applied to any aqueous stream in a corn wet milling process that contains a high molecular weight protein (e.g., M.W. of at least 5,000). The invention is especially well adapted for use on the gluten stream that is obtained from primary starch separation, but it can also be used with steepwater and wash water from gluten thickening. The process can be performed in batch or continuous mode. The membrane filtration can suitably be microfiltration or ultrafiltration, or both types of filtration can be used sequentially, depending on the objective. For microfiltration, the preferred pore size of the membrane is between about $0.002\mu$ and $0.5\mu$. For ultrafiltration, the preferred molecular weight cutoff of the membrane is between about 5,000 and 500,000, most preferably between about 5,000 and 100,000. In a preferred embodiment of the process, the retentate is at least partially dried prior to being added to corn gluten meal product.

The present invention permits the replacement of other separation equipment and techniques, such as centrifuges, with membrane filtration systems for the recovery and/or concentration of gluten and other proteins in aqueous streams in a corn wet milling process. Up to 10X concentration and possibly more can be achieved with one or more membrane filters, for example a combination of spiral membranes and ceramic membranes.

Processes in accordance with the present invention have a number of benefits compared to prior art processes. Among those benefits are: (1) enhanced profitability by recovering more gluten per unit amount of corn processed, thereby allowing the production of a greater amount of gluten-rich higher-value products, (2) elimination or reduction of the need for membrane filtration of steepwater, due to enhanced recovery of gluten elsewhere in the process, and (3) lower capital costs for the equipment needed to perform the process.

BRIEF DESCRIPTION OF THE DRAWINGS

FIGS. 3A and 3B are graphs of the results of an experiment in which an aqueous gluten dispersion was thickened through membrane microfiltration.

DESCRIPTION OF SPECIFIC EMBODIMENTS

Various embodiments of improved corn wet milling processes, or parts thereof, are described in this patent. Any portion of the processing not expressly discussed in this patent would be generally like previously known corn wet milling processes, for example as described in Corn Wet Milled Feed Products (Corn Refiners Association 1989).

Figure 1:
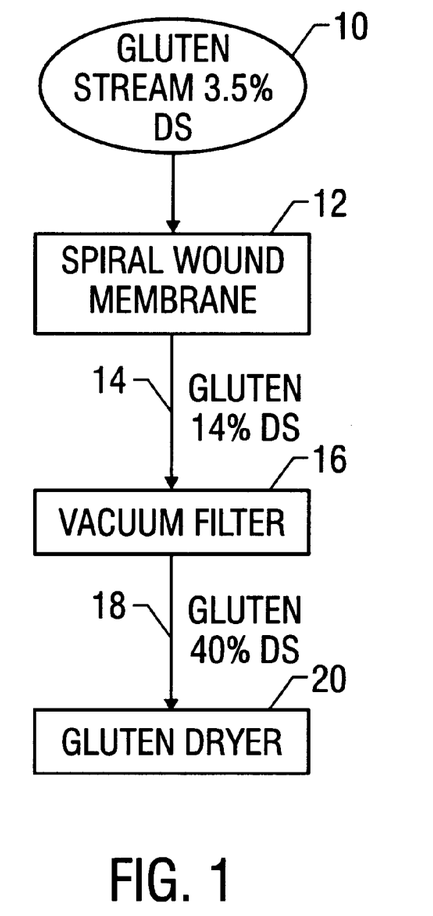
FIG. 1 is a process flow diagram for a process in accordance with the present invention.

FIG. 1 shows one embodiment of the present invention. An aqueous gluten stream 10 from a primary starch separation step in a corn wet milling operation will have, for example, about 3–5% dry solids (d.s.), preferably about 3.5% d.s., and a significant portion of which (e.g., preferably at least 50% by weight of the solids) will constitute gluten. The gluten stream 10 is fed to a first membrane filtration step 12, in which gluten is separated from some water in the stream 10 and some non-gluten solids. The retentate from this filtration is a first concentrated aqueous gluten stream 14, for example having about 13–15% d.s., preferably about 14% d.s. This first concentrated gluten stream 14 is then fed to a vacuum filtration step 16, and the filter cake from the filtration is a second concentrated aqueous gluten stream 18, for example having about 40% d.s. This second gluten stream 18 is then dried in a gluten dryer 20 to remove most of the remaining water, leaving gluten as the end product. Thus, in this embodiment of the process, the membrane filtration step 12 replaces a centrifuge that has been used in prior processes.

Figure 2:
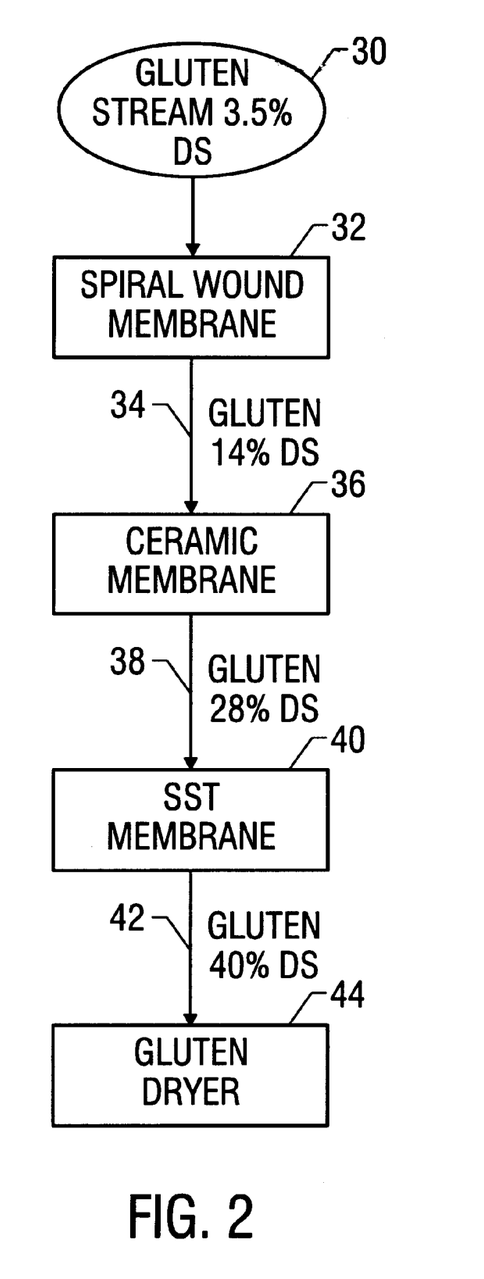
FIG. 2 is a process flow diagram for a different embodiment of a process in accordance with the present invention.

FIG. 2 shows another embodiment of the present invention. As in the previous embodiment, an aqueous gluten stream 30 (containing, e.g., 3–5% d.s.) from primary starch separation is fed to a first membrane filtration step 32. The retentate from this first membrane filtration 32 is a first concentrated aqueous gluten stream 34, for example having about 13–15% d.s., preferably about 14% d.s. In this embodiment, the first concentrated gluten stream 34 is fed to a second membrane filtration step 36, and the retentate from that filtration is a second concentrated aqueous gluten stream 38, for example having about 28% d.s. This second concentrated gluten stream 38 is then processed through a third membrane filtration step 40, producing a retentate 42 that has about 40% d.s. This third concentrated gluten stream 42 is then dried in a gluten dryer 44 as described above. Thus, in this embodiment, membrane filtration replaces both the gluten centrifuge and the vacuum filter that have been used in prior processes. The permeates from steps 32, 36, and 40 can also be filtered through membranes to recover soluble protein.

Various types of membrane filters can be used in the present invention. For example, in the embodiment of FIG. 1, the membrane filter used in step 12 is preferably a spiral-wound membrane filter. In the embodiment of FIG. 2, the first membrane filtration 32 preferably is performed with a spiral-wound membrane, the second membrane filtration 36 preferably is performed with a ceramic membrane, and the third membrane filtration 40 preferably is performed with a stainless steel membrane. Other combinations and permutations of the different types of membrane filters can be used. At present, spiral wound membranes are preferred because they are less expensive than either ceramic or stainless steel membranes; ceramic membranes are presently less expensive than stainless steel membranes. As indicated by FIGS. 1 and 2, membrane filtration can be used to replace one or more protein separation steps in a corn wet milling process.

Suitable membrane filters for use in the process of the present invention include spiral wound filters available from Koch, AMT, Osmonics, and DeSal, and ceramic filters from US Filter, Tech-Sep, and CeraMem. Other suitable membrane filters include Pallser™ VMF filters (Pall Filtron Corporation, Northborough, Mass.) and Scepter™ stainless steel membrane filter systems (Graver Separations, Glasgow, Del.). The Pallsep is a vibrating membrane system. To keep the membrane surface clean, the membrane is vibrated by a motor in the system. Other membrane systems use a high cross-flow velocity of the aqueous solution or dispersion across the stationary membrane to keep it clean.

EXAMPLE 1

Membrane filtration was tested with an aqueous gluten stream obtained from a corn wet milling plant. In the first part of this experiment, a spiral membrane (Osmonics HZ2O microfiltration membrane; about 120,000–200,000 molecular weight cutoff, 36 ft$^2$, 80 mil spacer) was used. The membrane filtration unit was operated in a batch recycle mode (retentate returned to the feed tank, permeate removed from the system). Initial volume of the aqueous gluten-containing suspension was 164 liters, and initial total solids was 3.8%. Filtration time was 80 minutes. Final volume was 25 liters, having total solids of 13.4%, at a concentration of 6.6X. The permeate was absolutely clear and had total solids of 1.7%. The overall flux was about 18 GFD (gallons per ft$^2$ per day).

Figure 3A:
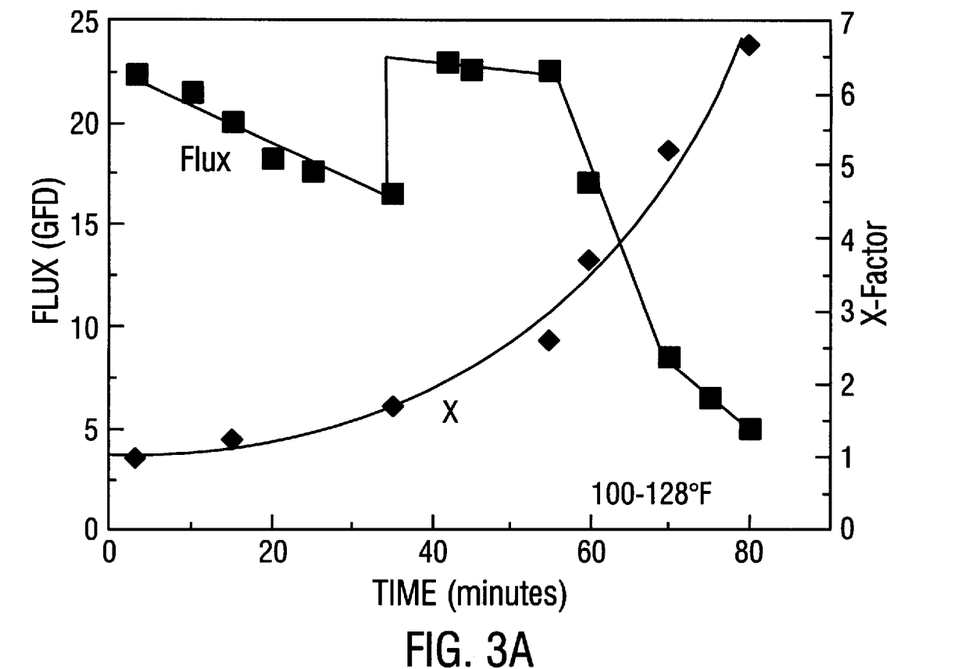
FIG. 3A shows the change in flux (■) and concentration (X-factor) (♦) over time.
Figure 3B:
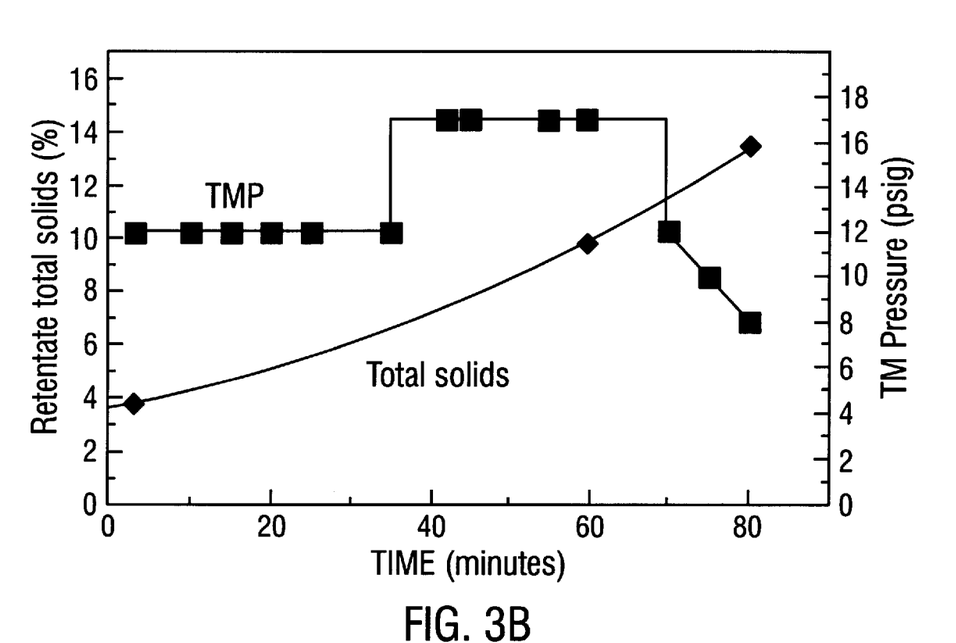
FIG. 3B shows the change in transmembrane pressure (TMP) (■) and total solids (♦) in the retentate over time.
Figure 4:
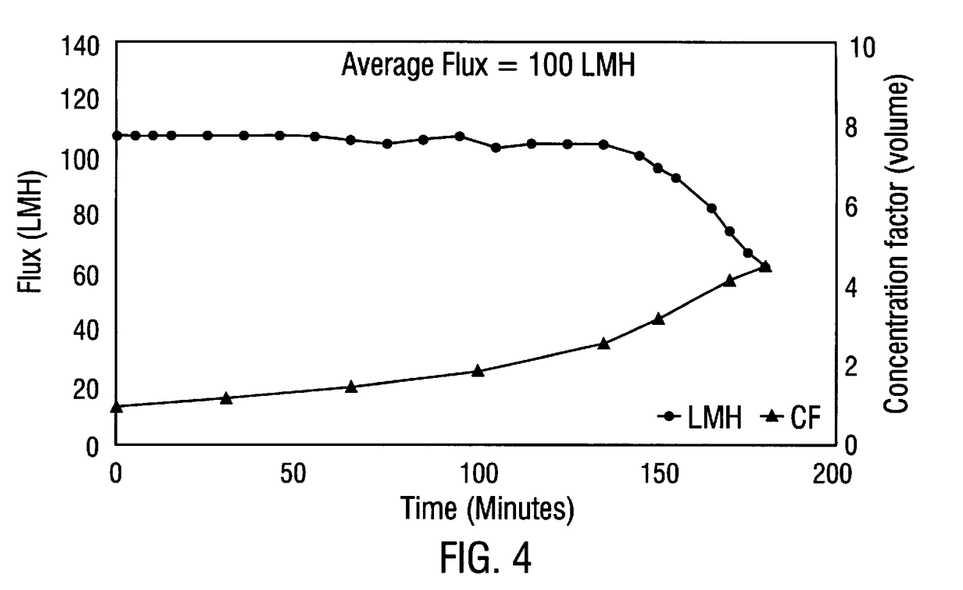
FIG. 4 is a graph of the change in flux (●) (LMH, liters per meter$^2$ per hour) and concentration factor (CF) (▲) over time in the membrane filtration of a starting material that contained 3% gluten.
Figure 5:
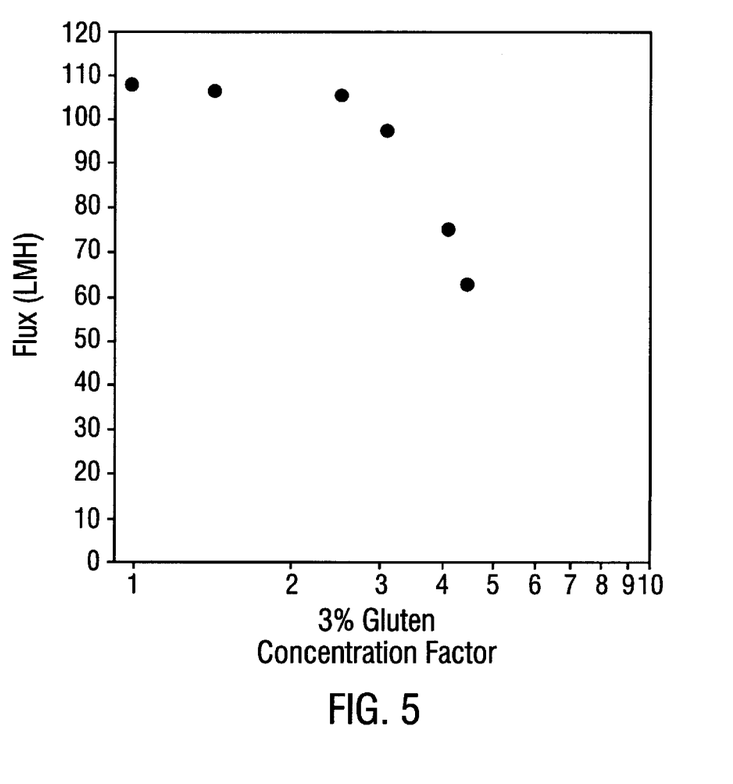
FIG. 5 is a graph of the change of flux in relation to concentration factor in the membrane filtration of a 3% gluten material.

FIG. 3A shows an initial flux of about 23 GFD, dropping rapidly to about 16 GFD at 1.6X concentration factor (X-factor). The trans-membrane pressure (TMP) was increased from 12 psi to 17 psi. Flux increased temporarily but then dropped again, rapidly above 3X. This was partially a result of increased viscosity, but as shown in FIG. 3B, also due to a decrease in TMP. The cross flow rate of feed across the membrane surface also decreased in later stages due to inadequate pump capacity.

In the second part of this experiment, a stainless steel membrane filtration system was operated in feed-and-bleed mode (feed into the system and remove the permeate continuously) at 5X concentration. Filtration continued for two hours at 140° F. Flux remained quite steady for the two hour period at 44–47 GFD, at 15 psi TMP and a cross flow rate of about 20 GPM.

EXAMPLE 2

Membrane filtration was used to concentrate an aqueous materials from corn wet milling that contained about 3% gluten, using a Pallsep filter system

TABLE 1

| Test Fluid | 3% gluten |
|---|---|
| batch volume (1) | 145 |
| permeate volume (1) | 110 |
| CF (by volume) | 4.5X |
| initial conc. (wt %) | 3% |
| wt % concentrate | 22.3% d.s. |
| wt % permeate | 2.8% d.s. |
| permeate temperature (° C.) | 50–44 |
| retentate temperature (° C.) | 52–48 |
| duration (min) | 180 |
| average flux (LMH) | 100 |
| flux range (LMH) | 108–62 |
| retentate-permeate pressure difference (psi) | 50 |
| feed-retentate pressure difference (psi) | 1–2 |

The experiment was stopped when the feed fluid was depleted.

EXAMPLE 3

Figure 6A:
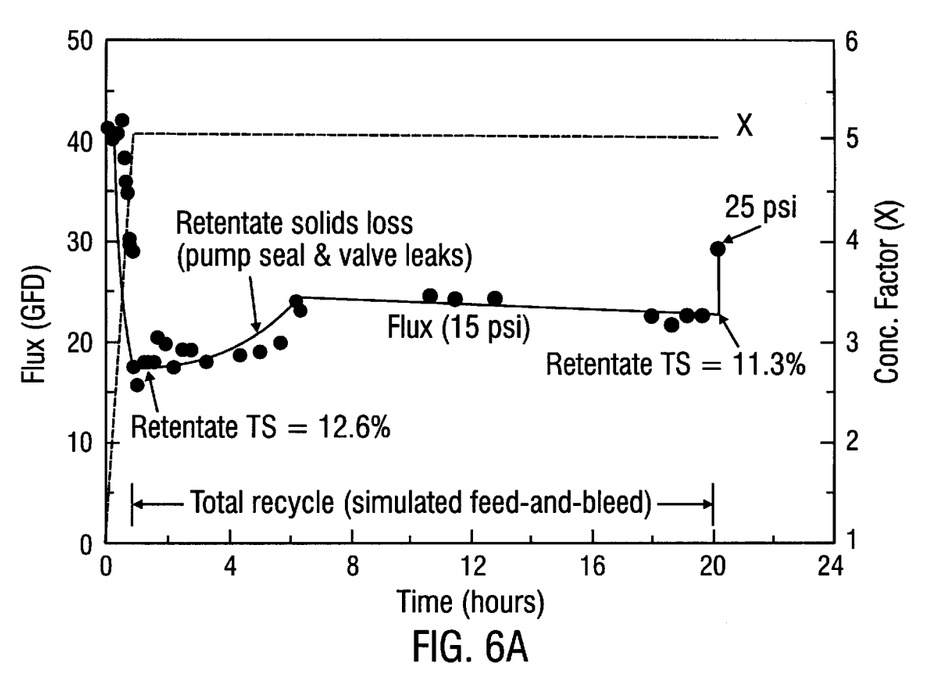
FIG. 6A is a graph of the change over time in flux (●) and concentration factor (dotted line) in a membrane filtration experiment.
Figure 6B:
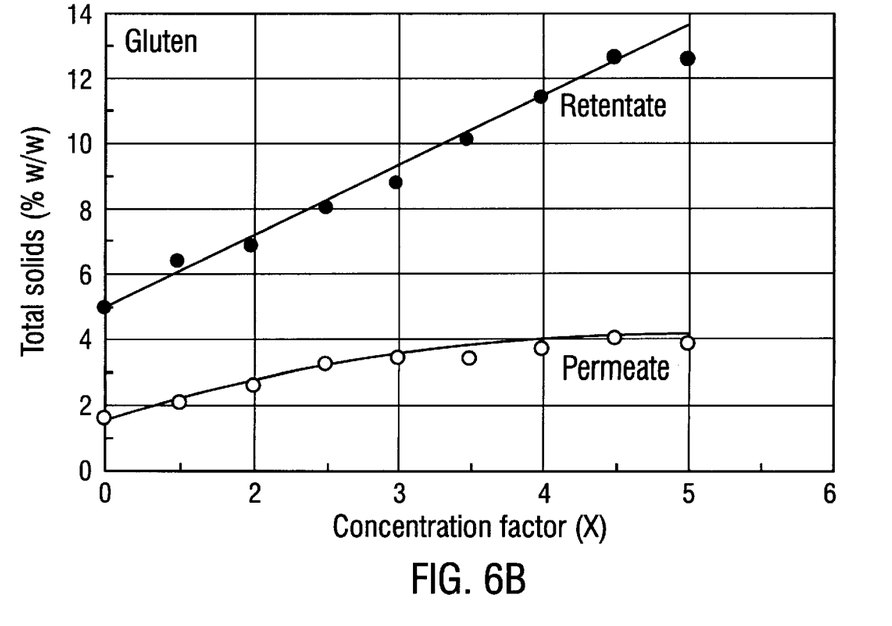
FIG. 6B is a graph showing the change in total solids in the retentate (●) and permeate (○) in that same experiment, as a function of concentration factor.

Two laboratory membrane filtration trials were conducted. The solids content of the feed was 4.8% d.s. The first used a Koch spiral microfiltration membrane (80 mil spacer, 34 ft$^2$ membrane surface area, 0.1$\mu$ pore size). This first trial was performed with a solution temperature of 120° F., $\Delta P$ (i.e., pressure drop across the membrane) of 10 psi, a transmembrane pressure (TMP, calculated as (membrane inlet pressure+membrane outlet pressure)/2 ) of 15 psi, and a concentration factor of 5X. The changes in flux and concentration factor over time are shown in FIG. 6A. The change in total solids in the retentate and the permeate in relation to concentration factor are shown in FIG. 6B.

Figure 7A:
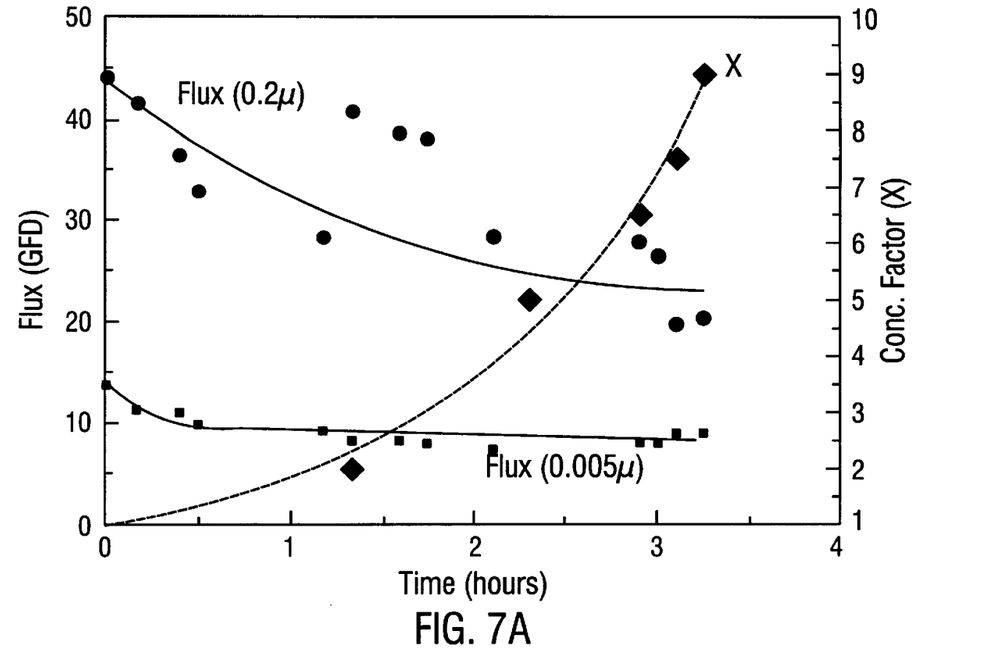
FIG. 7A is a graph showing the change over time in flux (● for a membrane having a $0.2\mu$ pore size; ■ for a membrane having a $0.005\ \mu$ pore size) and concentration factor (♦) in another membrane filtration experiment.
Figure 7B:
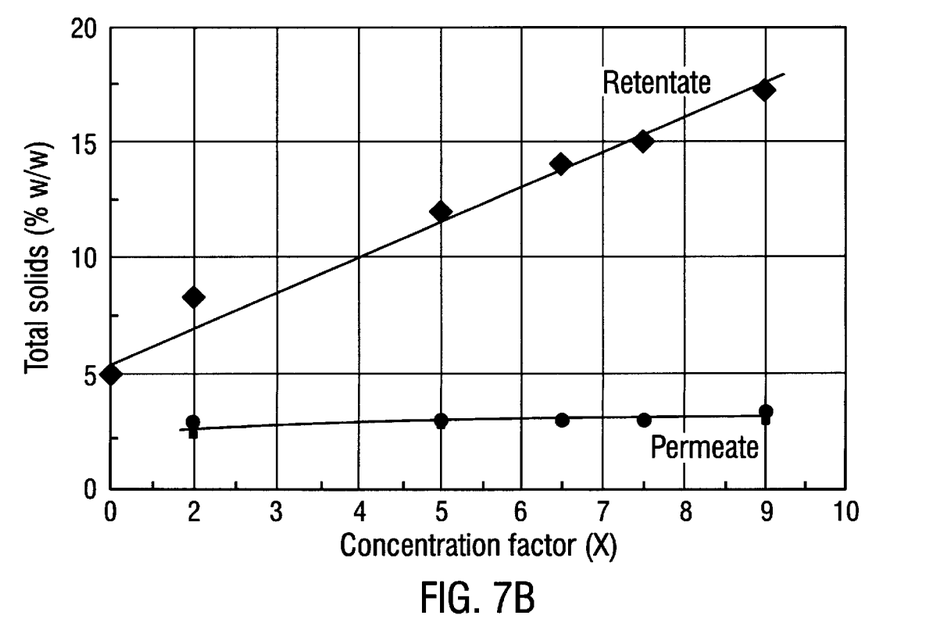
FIG. 7B is a graph showing the change in total solids in the retentate (♦) and permeate (●) in that same experiment, as a function of concentration factor.

The second trial used two different CeraMem microfiltration membranes (2 mm channel size, 1.5 ft$^2$ membrane surface area, 0.2$\mu$ and 0.005$\mu$ pore size, respectively). This trial was conducted with a solution temperature of 120° F., $\Delta P$ of 5 psi, and TMP of 22.5 psi. The changes in flux and concentration factor over time are shown in FIG. 7A. The change in total solids in the retentate and the permeate in relation to concentration factor are shown in FIG. 7B.

Figure 8A:
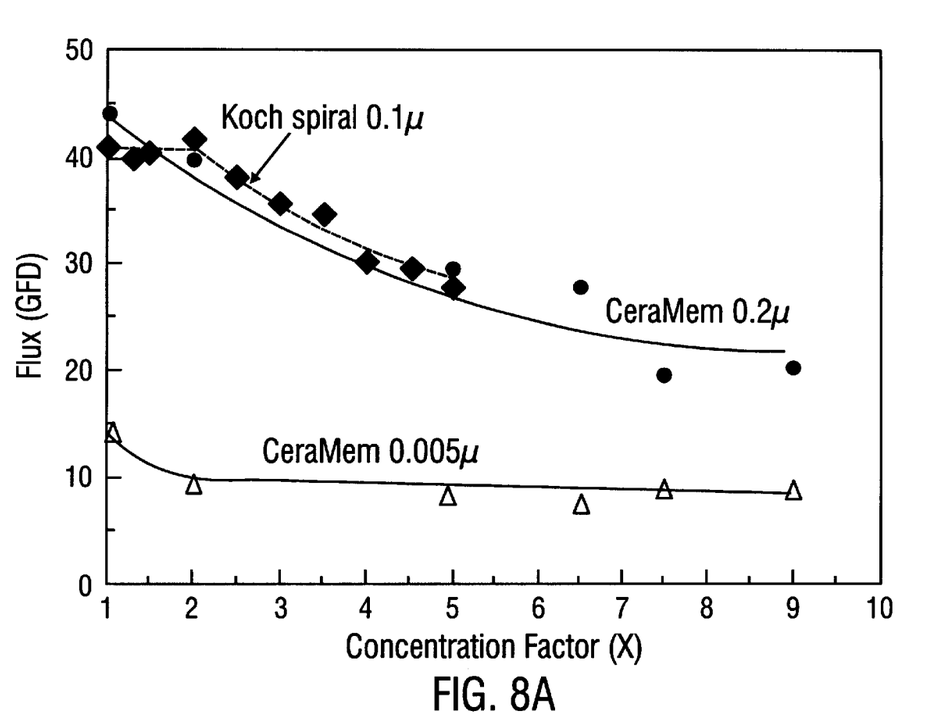
FIG. 8A is a graph showing the change in flux (● for a CeraMem membrane having $0.2\mu$ pore size; ♦ for a Koch spiral membrane having $0.1\mu$ pore size; A for a CeraMem membrane having $0.005\mu$ pore size) as a function of concentration factor for the two immediately preceding experiments.
Figure 8B:
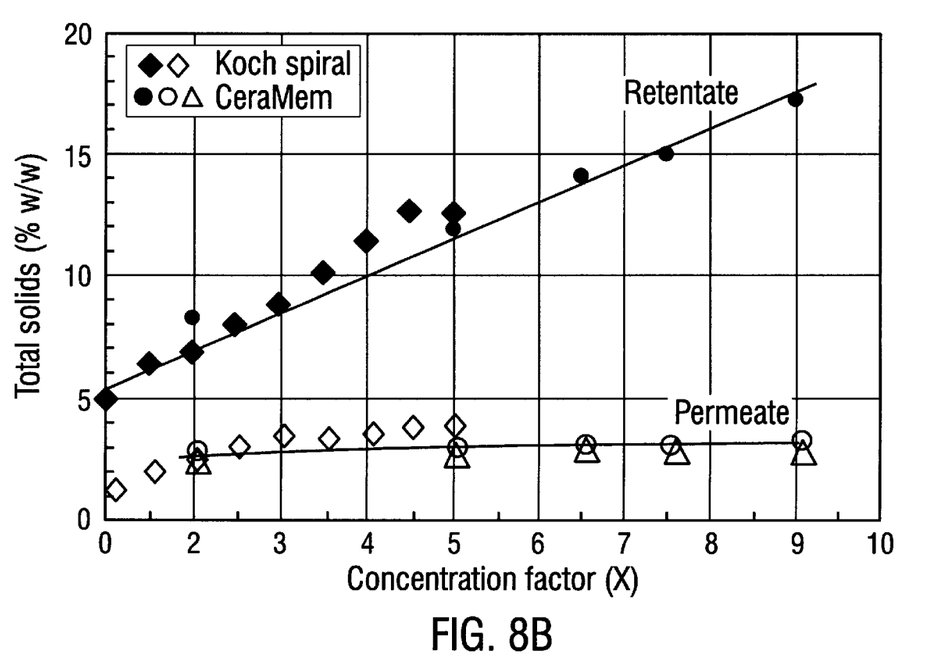
FIG. 8B is a graph showing the change in total solids (♦ retentate from Koch membrane; ● retentate from CeraMem membranes; ◇ permeate from Koch membrane; ○ permeate from CeraMem membrane ($0.2\mu$ pore size); Δ permeate from CeraMem membrane ($0.005\mu$ pore size)) in those same two experiments, as a function of concentration factor.

FIG. 8A compares the change in flux in relation to concentration factor for the two trials. FIG. 8B compares the change in total solids in relation to concentration factor for the two trials.

The solids content of the permeate from 1X–5X was almost the same with each of the membranes: CeraMem 0.005$\mu$=2.4–2.8%, CeraMem 0.2$\mu$=2.9 –3.0%, spiral= 2.1–4.0%.

EXAMPLE 4

Figure 9:
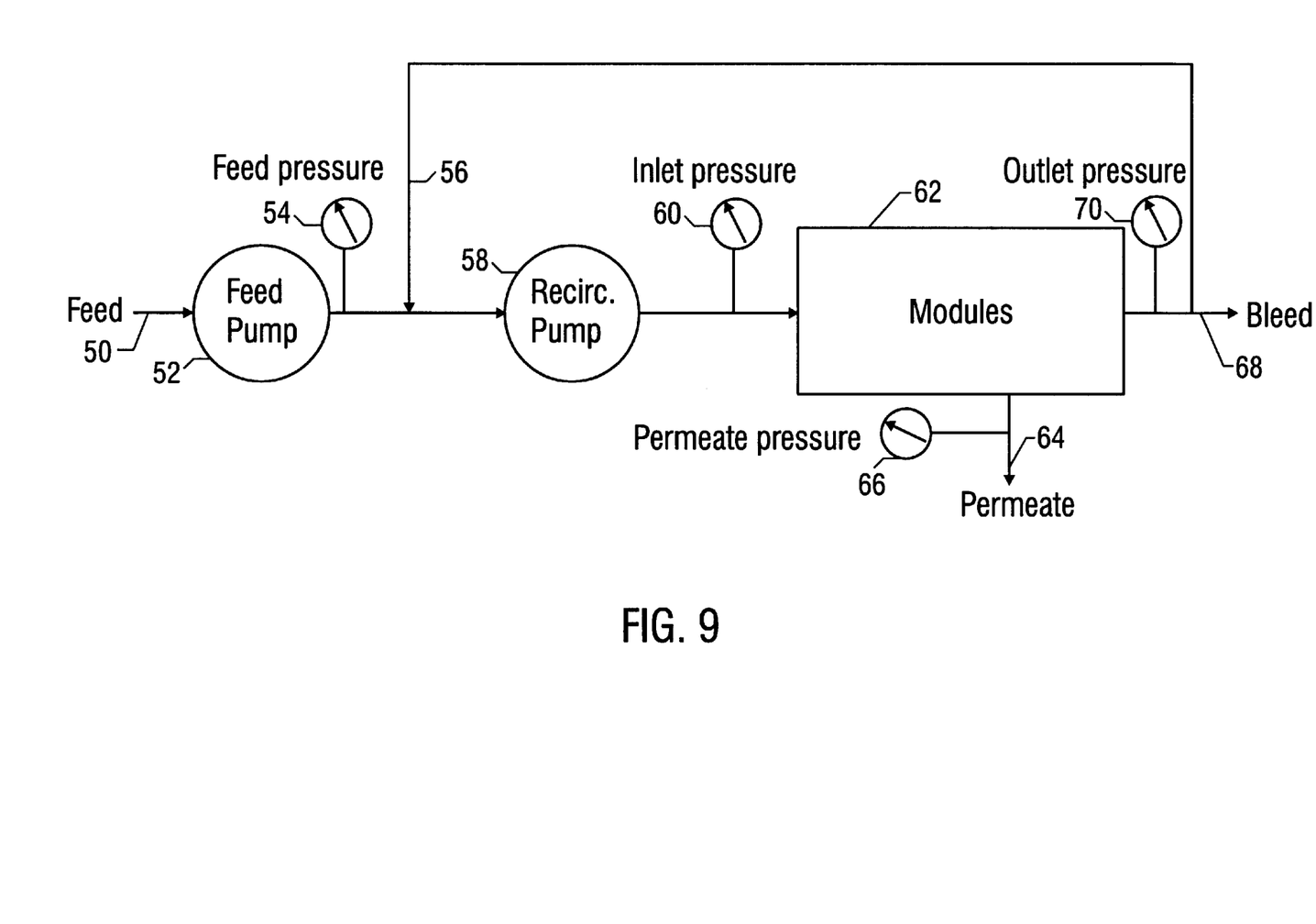
FIG. 9 is a schematic of a membrane filtration unit and its pressure measurement locations.

A series of membrane filtration trials were performed at a commercial corn wet milling plant, using a Koch spiral wound membrane having a 0.1μ pore size. FIG. 9 shows a schematic of the membrane filtration system and the related streams and pressure measurement points. A dilute aqueous feed 50 containing some gluten was fed to a feed pump 52. Feed pressure was measured at a point 54 downstream of the feed pump 52. A recycle stream 56 from the retentate was combined with the feed, and fed to a recirculation pump 58. Membrane inlet pressure was measured at a point 60 downstream of the recirculation pump 58. The combined feed then entered the membrane filtration modules 62. The permeate stream 64 had its pressure measured at a point 66 downstream of the filter module. Likewise, the bleed (i.e., retentate removal) stream 68 had its pressure measured at a point 70.

In this configuration TMP=(inlet pressure 60+outlet pressure 70)/2. The pressure drop (ΔP)=inlet pressure 60−outlet pressure 70. The outlet pressure was assumed to be equal to the feed pressure. The permeate pressure was assumed to be 0.

Data from trials 1–22 are shown in Table 2. The trials began with a membrane area of 19,000 ft$^2$. After trial 6, the area was reduced to 14,400 ft$^2$ to increase the pressure drop and the cross-flow rate. For each trial, at various points in time after the beginning of the trial, the table gives concentration factor (X), flux (gal/ft$^2$/day), feed pressure (psi), pressure drop (psi), TMP (psi), feed spin, retentate spin, and retentate protein (% solids on a dry basis). The spin data represents measurements made using a Baume spindle, and can be used to estimate the solids content of a stream. Estimated solids equals double the spin number (i.e., a feed spin of 1.3 indicates 2.6% (by weight) dry solids in the stream).

TABLE 2

| Trial (temp.) | Time (h) | X | Flux (GFD) | Feed Press. | Pr. Drop | TMP (psi) | Feed Spin | Ret. Spin | Ret. Protein (db) |
|---|---|---|---|---|---|---|---|---|---|
| 1 | 0 | | 28 | 15 | | | 1.3 | | |
| (128° F.) | 0.5 | 2.2 | 20 | 20 | | | 1.8 | 4.6 | 69 |
| | 1.1 | 2 | 16.6 | 21 | | | 1.5 | 3.4 | |
| | 1.9 | 2 | 15.5 | 21 | | | 1.8 | 4 | 65 |
| | Backflush | | | | | | | | |
| | 2.9 | 2.2 | 17.4 | 27 | | | 1.8 | 4.5 | |
| | 3.7 | 2.2 | 16.9 | 26 | | | 1.8 | 4.3 | |
| | 5.2 | 2.1 | 14.8 | 26 | | | 2.1 | 4.8 | 70 |
| | 6.7 | 2.1 | 13.6 | 26 | | | 2.1 | 4.5 | |
| 2 | 0 | 2.9 | 24 | 30 | | | 1.6 | 4.6 | 68 |
| | 1 | 2.9 | 20 | 30 | | | 1.6 | 4.7 | |
| 3 | 0.5 | | 29.1 | 30 | | | 1.7 | 4.3 | 71 |
| (128° F.) | 1.5 | | 24.6 | 30 | | | 1.7 | 5.3 | |
| | 2.5 | 3 | 23.3 | 30 | 38.7 | 49 | 2 | 7.9 | |
| | 3.5 | 3 | 22.4 | 30 | 38.3 | 49 | 1.7 | 5.7 | |
| | 5 | 3 | 20.6 | 30 | 38.3 | 49 | 1.5 | 5.5 | |
| | 6 | 3 | 21.4 | 30 | 38.5 | 49 | 1.6 | 5.5 | 72 |
| | 7.5 | | 20.4 | 30 | | | | | |
| 4 | 1.1 | 2.8 | | 30 | 37.5 | 49 | 1.6 | 5.8 | 72 |
| (127° F.) | 2.2 | 2.9 | | 30 | 38.4 | 49 | 2.1 | 8 | |
| | 4 | 3 | 24 | 30 | 38.5 | 49 | 2.4 | 8.2 | |
| | 5.5 | 3 | 23 | 30 | 38.9 | 49 | | | |
| | 7 | 3 | 22 | 30 | 38.9 | 49 | | | 66 |
| | 8.5 | 3 | 21 | 30 | 38.6 | 49 | 1.2 | 4 | |
| | 10 | 2.9 | 20 | 30 | 38.9 | 49 | 1.3 | 4.2 | |
| | 11.5 | 3 | 18.6 | 30 | 39.2 | 50 | 1.3 | 4.3 | 68 |
| | 13 | 3 | | 30 | 39.1 | 50 | 1.3 | 3.8 | |
| 5 | 0 | | 30 | 15 | 34.4 | 32 | 1.3 | 3.1 | 60 |
| | 1.5 | 2.8 | 20 | 30 | 37.5 | 49 | 1.2 | 3.6 | |
| | 3 | 2.8 | 13 | 30 | 39.4 | 50 | 1.4 | 3.6 | |
| | 3.5 | 2.6 | 12.6 | 30 | 39.4 | 50 | | | 62 |
| | Cleaned | | | | | | | | |
| (130° F.) | 0 | | | | | | | | |
| | 0.75 | 3.5 | 28 | 30 | 37.5 | 49 | 1.6 | 5.7 | |
| | 2.25 | 2.9 | 20 | 31 | 38 | 50 | 1.3 | 3.6 | |
| | 3.5 | 2.9 | 16.5 | 31 | 38.7 | 50 | 1.5 | 5.6 | |
| | 4.6 | 2.9 | 13.6 | 31 | 38.5 | 50 | 1.8 | 5.7 | |
| | 5.1 | 2.5 | | 31 | 37.7 | 50 | 1.9 | 2.9 | 70 |
| 6 | 0.5 | 2.9 | 21 | 23 | 37.6 | 42 | 1.2 | 3.8 | 69 |
| (130° F.) | 1.3 | 3 | 20 | 30 | 38.5 | 49 | 1.5 | 4.5 | |
| | 2 | 2.9 | 20 | 35 | 38 | 54 | 1.8 | 6.1 | |
| | 3 | 3 | 18 | 35 | 38.3 | 54 | 1.8 | 5.6 | 71 |
| | 3.6 | 3 | 17 | 35 | 38.3 | 54 | 1.8 | 5.4 | |
| | 5.6 | 3 | 18 | 35 | 38.7 | 54 | 1.5 | 4.7 | |
| | 7.6 | 3 | 16 | 35 | 38.6 | 54 | 1.5 | 4.6 | 66 |
| | 9.6 | 3 | 16 | 35 | 38.1 | 54 | 1.5 | 4.7 | |
| | 11.6 | 3 | | 36 | 38.8 | 55 | 1.5 | 5 | 66 |
| | Cleaned | | | | | | | | |
| 7 | 0.3 | 3 | 27 | 35 | 45.3 | 58 | 1.4 | 3.8 | |
| (128° F.) | 0.5 | 3 | 19 | 40 | 45 | 63 | 1 | 2.8 | |
| | 2 | 2.7 | 13 | 40 | 37.7 | 59 | 1.8 | 4.2 | |
| | 3 | 2.6 | | 43 | 37.9 | 62 | 1.6 | 4 | 68 |
| | Cleaned | | | | | | | | |
| | 0.4 | 3.5 | 26 | 33 | 37.5 | 52 | 1.5 | 5.1 | 70 |

TABLE 2-continued

| Trial (temp.) | Time (h) | X | Flux (GFD) | Feed Press. | Pr. Drop | TMP (psi) | Feed Spin | Ret. Spin | Ret. Protein (db) |
|---|---|---|---|---|---|---|---|---|---|
| | 3 | 3 | 23 | 33 | 37.5 | 52 | 1.4 | 4.1 | |
| | 5 | 3 | 20 | 35 | 38.1 | 54 | 1.5 | 4.4 | 70 |
| | 7 | 3 | 20 | 35 | 38.1 | 54 | 1.6 | 4.3 | |
| | 9 | 3 | 18 | 35 | 39 | 55 | 1.9 | 5.8 | |
| | 11 | 3 | 16 | 35 | 39 | 55 | 1.9 | 6.1 | |
| 8 | 0.25 | 3 | 25.5 | 25 | 37 | 44 | 1.2 | 3.6 | |
| (128° F.) | 0.75 | 3 | 23 | 25 | 38 | 44 | 1.2 | 3.7 | 69 |
| | 2 | 3 | 19.5 | 30 | 38 | 49 | 1.3 | 4.3 | |
| | 5 | 3 | 18 | 30 | 38 | 49 | 1.3 | 4.5 | 65 |
| | 7 | 3 | 17.6 | 30 | 38 | 49 | 1.3 | 4 | |
| | 9 | 3 | 16.5 | 32 | 38 | 51 | 1.4 | 5.3 | |
| | 10.5 | 3 | 17.6 | 35 | 39 | 55 | | | |
| | 12.5 | 3 | 17.5 | 35 | 39 | 55 | 1.2 | 4 | |
| | 14.5 | 3 | 17.5 | 35 | 39 | 55 | 1.3 | 4.3 | 70 |
| | 16 | 3 | 17.25 | 35 | 39 | 55 | 1.3 | 4.2 | |
| | 18 | 3 | 16 | 36 | 39 | 56 | 1.3 | 4.4 | 69 |
| | 20 | 3 | 15.6 | 36 | 39 | 56 | | | 69 |
| 9 | 0.25 | 3 | 27.3 | 20 | 35 | 38 | 1.2 | 3.3 | 69 |
| (130° F.) | 1 | 3 | 17.5 | 20 | 35 | 38 | 1.2 | 4 | |
| | 2.5 | 3 | 22 | 25 | 45 | 48 | 1.2 | 3.9 | |
| | 4.1 | 3 | 21 | 25 | 45 | 48 | 1.2 | 4.2 | 68 |
| | 4.75 | 3 | 30 | 40 | 47 | 64 | 1.2 | 4 | |
| | 7 | 3 | 30 | 45 | 48 | 69 | 1.4 | 4.2 | |
| | 10 | 3 | 27.5 | 45 | 48 | 69 | 1.4 | 4 | |
| | 12.5 | 3 | 22 | 45 | 48 | 69 | 1.1 | 3.6 | 72 |
| | 14.5 | 3 | 20.4 | 45 | 48 | 69 | 1.2 | 3.8 | |
| | 17 | 3 | 19.6 | 45 | 48 | 69 | 1.5 | 4.4 | 61 |
| 10 | 0.3 | 3 | 29.7 | 35 | 37 | 54 | 1.3 | 4.1 | |
| (129° F.) | 0.8 | 3 | 26.8 | 35 | 38 | 54 | 1.3 | 4.6 | |
| | 4.5 | 3 | 23 | 35 | 38 | 54 | 1.2 | 4 | |
| | 7.4 | 3 | 23 | 35 | 39 | 55 | 1.5 | 4.6 | |
| | 9.5 | 3 | 23 | 35 | 39 | 55 | 1.3 | 4.6 | |
| | 11.8 | 3 | 21 | 35 | 39 | 55 | 1.4 | 4.4 | |
| | 13.8 | 3 | 20 | 35 | 38 | 54 | 1.3 | 4.3 | |
| | 15.5 | 3 | 19 | 35 | 39 | 55 | 1.4 | 4.6 | |
| | 18 | 3 | 17 | 35 | 38 | 54 | 1.3 | 4.4 | |
| | 21.5 | 3 | 16 | 35 | 39 | 55 | 1.2 | 4.2 | |
| | 24 | 3 | 16 | 35 | 40 | 55 | 1.4 | 4.2 | |
| 11 | 0.1 | 3 | 32 | 35 | 36 | 53 | 1.2 | 3.5 | 62 |
| (128° F.) | 2 | 3 | 24 | 35 | 38 | 54 | 1.3 | 4 | 66 |
| | 4.45 | 3 | 19 | 35 | 39 | 55 | 1.4 | 4.5 | 62 |
| | 7.4 | 3 | 17.5 | 35 | 39 | 55 | 1.4 | 4.5 | |
| | 8.5 | 3 | 17 | 35 | 39 | 55 | 1.4 | 3.8 | |
| | 9.5 | 3.2 | 17 | 35 | 39 | 55 | 1.3 | 3.8 | |
| | 10.5 | 3.1 | 17 | 40 | 39 | 60 | 1.3 | 5.8 | |
| | 11.5 | 3.2 | 16 | 40 | 39 | 60 | 1.4 | 4.2 | |
| | 12.5 | 3.3 | 16 | 40 | 39 | 60 | 1.6 | 5.4 | 71 |
| | 13.5 | 3.1 | 16 | 40 | 39 | 60 | 1.8 | 5.8 | |
| | 14.5 | 3.1 | 15 | 40 | 39 | 60 | 1.7 | 6.4 | |
| | 15.5 | 3 | 15 | 40 | 39 | 60 | 1.5 | 4.3 | |
| | 16.5 | 3.1 | 15 | 42 | 39 | | 1.9 | 5.8 | |
| (128° F.) | 17.5 | 3.1 | 14 | 42 | 39 | 62 | 1.9 | 7.8 | |
| | 18.5 | 3 | 14.5 | 41 | 39 | 61 | 1.9 | 5.8 | |
| | 20.5 | 3 | 14 | 40 | 39 | 60 | 1.9 | 5.6 | |
| | Cleaning | | | | | | | | |
| 12 | 0.5 | 3 | 30 | 35 | 37 | 54 | 1.2 | 3.6 | |
| | 2.5 | 3 | 18.5 | 35 | 38 | 54 | 1.4 | 4.3 | |
| | 4.5 | 3 | 17.3 | 35 | 38 | 54 | 2.5 | 6.2 | |
| | 6.5 | 3 | 16.2 | 36 | 39 | 56 | 1.6 | 4.9 | |
| | 7 | 3 | | | | | | | |
| | Cleaning | | | | | | | | |
| 13 | 0.5 | 3.2 | 24.5 | 35 | 38 | 54 | 1.7 | 5 | |
| (128° F.) | 2.5 | 3 | 17.2 | 30 | 38 | 49 | 1.6 | 4.8 | |
| | 3.5 | 3 | 15.2 | 30 | 38 | 49 | 1.8 | 5 | |
| | 4.5 | 3 | 15.9 | 33 | 39 | 53 | 1.8 | 5.4 | |
| | 5.5 | 3 | 15.1 | 33 | 39 | 53 | 1.8 | 4.8 | |
| | 6.5 | 3 | 14.2 | 33 | 39 | 53 | 1.8 | 4.8 | |
| | 7.5 | 2.9 | 13.1 | 33 | 39 | 53 | | | |
| 14 | 0.75 | 3.1 | 19.72 | 20 | 37 | 39 | 1.6 | 4.9 | |
| | 2.75 | 3 | 17.4 | 30 | 38 | 49 | 1.4 | 5 | |
| (127° F.) | 4.75 | 3 | 17.4 | 35 | 38 | 54 | 1.4 | 4.9 | |
| | 6.75 | 3 | 16.4 | 35 | 38 | 54 | 1.5 | 5.3 | |
| | 8.25 | 3 | 16 | 35 | 38 | 54 | 1.9 | 5.9 | |
| | 9.25 | 3 | 16 | 35 | 38 | 54 | 1.9 | 6 | |
| | 11.25 | 3 | 14 | 35 | 39 | 55 | 2 | 6 | |
| | Cleaning | | | | | | | | |
| | 0.5 | 2.8 | 22 | 15 | 36 | 33 | 1.9 | 5 | |

TABLE 2-continued

| Trial (temp.) | Time (h) | X | Flux (GFD) | Feed Press. | Pr. Drop | TMP (psi) | Feed Spin | Ret. Spin | Ret. Protein (db) |
|---|---|---|---|---|---|---|---|---|---|
| | 1 | 3 | 14 | 15 | 37 | 34 | 1.9 | 5.8 | |
| | 5 | 3 | 13 | 15 | 37 | 34 | 1.9 | 5.9 | |
| | 7 | 3 | 11 | 15 | 38 | 34 | 2 | 5.8 | |
| | 9 | 3 | 11 | 15 | 37 | 34 | 1.8 | 5.6 | |
| 15 | 0.25 | 3.5 | 31 | 30 | 41 | 51 | 1.4 | 4.5 | |
| (126° F.) | 0.5 | 3.5 | 23 | 30 | 40 | 50 | 1.4 | 5.1 | |
| | 3.4 | 3.5 | 17.4 | 30 | 40 | 50 | 1.7 | 5.8 | |
| | 5 | 3.5 | 19 | 30 | 45 | 53 | 1.5 | 5.5 | |
| | 6.75 | 3.5 | 17 | 30 | 45 | 53 | 1.3 | 5.3 | |
| | 8.25 | 3.5 | 16 | 30 | 45 | 53 | 1.4 | 5.4 | |
| | 11 | 3.5 | 16 | 30 | 45 | 53 | 1.6 | 5.1 | |
| | 13 | 3.5 | 15 | 30 | 45 | 53 | 1.6 | 5.5 | |
| | 18 | 3.5 | 13 | 30 | 45 | 53 | 1.6 | 5.6 | |
| | Cleaned | | | | | | | | |
| 16 | 0.25 | 4 | 31 | 25 | 40 | 45 | 1.3 | 3.5 | |
| (127° F.) | 1 | 4 | 22 | 25 | 40 | 45 | 1.3 | 5.6 | |
| | 2 | 4 | 19 | 25 | 40 | 45 | 1.4 | 5.9 | |
| | 3 | 4 | 19 | 25 | 45 | 48 | 1.3 | 6.2 | |
| | 4 | 4 | 18 | 25 | 45 | 48 | 1.3 | 5.9 | |
| | 5 | 4 | 19 | 30 | 45 | 53 | 1.4 | 6.2 | |
| | 8 | 4 | 17 | 30 | 45 | 53 | | | |
| | 20 | 4 | 16 | 30 | 45 | 53 | 1.3 | 4.5 | |
| (129° F.) | Cleaned | | | | | | | | |
| 17 | 0.25 | 4.5 | 31 | 25 | 40 | 45 | 1.3 | 4.5 | |
| (129° F.) | 1.25 | 4.5 | 22 | 25 | 40 | 45 | 1.3 | 6.5 | |
| | 3.5 | 4.5 | 18 | 25 | 40 | 45 | 1.4 | 7.5 | |
| | 4.5 | 4.5 | 19 | 25 | 50 | 50 | 1.4 | 8.5 | |
| | 5.5 | 4.5 | 19 | 25 | 50 | 50 | 1.5 | 8.8 | |
| | 7 | 4.5 | 19 | 30 | 50 | 55 | 1.5 | 7.6 | |
| | 9 | 4.5 | 18 | 30 | 50 | 55 | 1.5 | 6.6 | |
| | 12 | 4.5 | 17 | 30 | 50 | 55 | 1.6 | 8.4 | |
| | 15 | 4.5 | 15 | 30 | 50 | 55 | 1.3 | 6.8 | |
| (130° F.) | 18 | 4.5 | 15 | 30 | 48 | 54 | 1.2 | 5.4 | |
| | 20 | 4.5 | 11 | 30 | 50 | 55 | 1.3 | 6.9 | |
| | Cleaned | | | | | | | | |
| 18 | 0.5 | 4.5 | 29 | 15 | 50 | 40 | 1.6 | 6.9 | |
| | 2.5 | 4.5 | 20 | 20 | 40 | 40 | 2 | 7.1 | |
| | 5.5 | 4.5 | 19 | 25 | 47 | 49 | 1.7 | 6.3 | |
| | 7.5 | 4.5 | 19.6 | 30 | 47 | 54 | 1.6 | 6.4 | |
| | 9.8 | 4.5 | 18 | 30 | 49 | 55 | 1.7 | 6.4 | |
| | 11.5 | 4.5 | 18.2 | 30 | 49 | 55 | 1.8 | 10 | |
| | 13.5 | 4.5 | 17 | 30 | 50 | 55 | 2 | 8.8 | |
| (131° F.) | 15.5 | 4.5 | 17 | 30 | 50 | 55 | 2 | 7.8 | |
| | 17.5 | 4.5 | 16 | 30 | 50 | 55 | 2.3 | 10.5 | |
| | 19.5 | 4.5 | 15 | 30 | 50 | 55 | 3 | 8.8 | |
| | 21.5 | 4.5 | 15 | 30 | 50 | 55 | | | |
| (132° F.) | 23.5 | 4.5 | | 35 | 50 | 60 | 2.1 | 8 | |
| 19 | 0.5 | 5 | 21 | 20 | 45 | 43 | 1.4 | 6.1 | |
| (130° F.) | 3.5 | 4.5 | 16 | 25 | 50 | 50 | 1.3 | 7.1 | |
| | 5.5 | 4.5 | 17 | 25 | 50 | 50 | 1.4 | 7.2 | |
| | 7 | 4.5 | 17.5 | 30 | 50 | 55 | 2 | 7.8 | |
| | 9 | 4.5 | 17 | 30 | 50 | 55 | 1.8 | 10.4 | |
| | 11 | 4.5 | 17 | 30 | 50 | 55 | 1.9 | 11 | |
| | 13 | 4 | 17 | 30 | 50 | 55 | 2 | 8.5 | |
| | 15 | 4.2 | 16 | 30 | 50 | 55 | 1.4 | 5.8 | |
| | Cleaned | | | | | | 0 | | |
| 20 | 1 | 5 | 26 | 15 | 59 | 45 | 1.3 | 6.5 | |
| (130° F.) | 3 | 4.5 | 19 | 25 | 43 | 47 | 1.4 | 6.8 | |
| | 5 | 4.5 | 16 | 25 | 48 | 49 | 1.4 | 6.6 | |
| | 7 | 5 | 14 | 25 | 48 | 49 | 1.4 | 7.5 | |
| | 9 | 4 | 15 | 30 | 48 | 54 | 1.3 | 6.7 | |
| | 11 | 4 | 15 | 30 | 49 | 55 | 1.8 | 9.7 | |
| | 13 | 4 | 14 | 30 | 50 | 55 | 2 | 9.3 | |
| | 15 | 4 | 14 | 30 | 50 | 55 | 2.1 | 9.6 | |
| | 17 | 4 | 13 | 30 | 50 | 55 | 2.2 | 9.5 | |
| | 19 | 4 | 14 | 30 | 50 | 55 | 1.5 | 7.8 | |
| | Cleaned | | | | | | | | |
| | (4 hours) | | | | | | | | |
| | 1.5 | 4.5 | 23 | 30 | 50 | 55 | 1.3 | 5.5 | |
| | 3.5 | 4.5 | 20 | 30 | 50 | 55 | 1.3 | 6.8 | |
| | 5.5 | 4.5 | 19 | 30 | 50 | 55 | 1.3 | 5.9 | |
| | 7.5 | 4.5 | 18 | 30 | 50 | 55 | | | |

These data suggest that the highest flux can be obtained (1) at the highest ΔP, (2) by gradually increasing TMP, and (3) by keeping TMP below 55 psi.

The preceding description of specific embodiments of the present invention is not intended to be a complete list of every possible embodiment of the invention. Persons skilled in this field will recognize that modifications can be made to the specific embodiments described here that would be within the scope of the present invention.

We claim:

1. In a corn wet milling process, in which corn kernels are milled to facilitate the separation of the components thereof, in which starch from the corn is separated from gluten, and in which at least one aqueous gluten-containing stream is generated, the improvement comprising the steps of:

membrane filtration of an aqueous gluten-containing stream which is a product of a primary starch-gluten separation step using a membrane that retains materials having a molecular weight of about 5,000 or greater, producing a gluten-enriched retentate; and     removing water from the gluten-enriched retentate, thereby producing a substantially dry gluten product.

2. The process of claim 1, further comprising a second membrane filtration step, which further concentrates the gluten-enriched retentate prior to the final removal of water step.

3. The process of claim 1, where the gluten-enriched retentate has a solids concentration of at least about 7% by weight.

4. The process of claim 1, where the gluten-enriched retentate has a solids concentration of at least about 40% by weight.

5. A corn wet milling process, comprising the steps of:

separating corn starch from gluten, producing a first aqueous gluten-containing stream, which has a gluten concentration of about 2–5% d.s.;

membrane filtering the first aqueous gluten-containing stream using a membrane that retains materials having a molecular weight of about 5,000 or greater, producing as a retentate a second aqueous gluten-containing stream, which has a gluten concentration of about 13–15% d.s.;

non-membrane vacuum filtration of the second aqueous gluten-containing stream, producing a third aqueous gluten-containing stream, which has a gluten concentration of about 38–43% d.s.; and     drying the third aqueous gluten-containing stream to form a gluten product having a solids concentration of at least about 90% d.s.

6. A corn wet milling process, comprising the steps of:

separating corn starch from gluten, producing a first aqueous gluten-containing stream, which has a gluten concentration of about 2–5% d.s.;

membrane filtering the first aqueous gluten-containing stream using a membrane that retains materials having a molecular weight of about 5,000 or greater, producing as a retentate a second aqueous gluten-containing stream, which has a gluten concentration of about 13–15% d.s.;

membrane filtering the second aqueous gluten-containing stream, producing as a retentate a third aqueous gluten-containing stream, which has a gluten concentration of about 25–30% d.s.;

membrane filtering the third aqueous gluten-containing stream, producing as a retentate a fourth aqueous gluten-containing stream, which has a gluten concentration of about 38–43% d.s.; and     drying the fourth aqueous gluten-containing stream to form a gluten product having a solids concentration of at least about 90% d.s.

7. The process of claim 6, where the membrane filtration of the first aqueous gluten-containing stream is done with a spiral-wound membrane, the membrane filtration of the second aqueous gluten-containing stream is done with a ceramic membrane, and the membrane filtration of the third aqueous gluten-containing stream is done with a stainless steel membrane.

8. A corn wet milling process having product streams that include a corn gluten feed stream and a corn gluten meal stream, the corn gluten meal stream having a higher concentration of gluten than the corn gluten feed stream, the process comprising the steps of:

milling the corn kernels in the presence of water to facilitate the separation of the components thereof;

producing an aqueous stream containing starch and gluten;

membrane filtering the aqueous stream containing starch and gluten, using a membrane that retains materials having a molecular weight of about 5,000 or greater, thereby producing a gluten-enriched retentate; and     adding the gluten-enriched retentate to the corn gluten meal stream.

\* \* \* \* \*